US006975094B1

(12) United States Patent
Lascaud et al.

(10) Patent No.: US 6,975,094 B1
(45) Date of Patent: Dec. 13, 2005

(54) METHOD AND DEVICE FOR CHARGING SEVERAL ELECTROCHEMICAL CELLS

(75) Inventors: Stéphane Lascaud, Fontainebleau (FR); Eric Baudoin, Veneux les Sablons (FR); Eric Bettega, Le Fontanil Cornillon (FR); Michel Barrault, St Christophe en Oisans (FR)

(73) Assignees: Electricite de France-Service National, Paris (FR); Schneider Electric Industries S.A., Rueil-Malmaison (FR)

( * ) Notice: Subject to any disclaimer, the term of this patent is extended or adjusted under 35 U.S.C. 154(b) by 140 days.

(21) Appl. No.: 10/030,541

(22) PCT Filed: Jun. 21, 2000

(86) PCT No.: PCT/FR00/01726

§ 371 (c)(1),
(2), (4) Date: Jul. 15, 2003

(87) PCT Pub. No.: WO01/05014

PCT Pub. Date: Jan. 18, 2001

(30) Foreign Application Priority Data

Jul. 12, 1999 (FR) .................................. 99 09021

(51) Int. Cl.[7] .............................................. H02J 7/00
(52) U.S. Cl. .................................................. 320/122
(58) Field of Search ............................... 320/150, 120, 320/122, 119, 153

(56) References Cited

U.S. PATENT DOCUMENTS

| 3,917,990 | A | * | 11/1975 | Sherman, Jr. | ............... 320/150 |
| 4,079,303 | A | * | 3/1978 | Cox | ........................... 320/119 |
| 4,125,802 | A | * | 11/1978 | Godard | ....................... 320/150 |
| 4,238,721 | A | * | 12/1980 | DeLuca et al. | ............. 320/122 |
| 5,281,792 | A | * | 1/1994 | Lee et al. | .................... 219/209 |
| 5,387,857 | A | * | 2/1995 | Honda et al. | ............... 320/120 |
| 5,773,959 | A | * | 6/1998 | Merritt et al. | .............. 320/120 |
| 6,025,696 | A | * | 2/2000 | Lenhart et al. | ............. 320/122 |
| 6,057,050 | A | * | 5/2000 | Parise | ........................... 429/7 |
| 6,388,424 | B1 | * | 5/2002 | Hidaka et al. | .............. 320/122 |

* cited by examiner

*Primary Examiner*—Michael Sherry
*Assistant Examiner*—Samuel Berhanu
(74) *Attorney, Agent, or Firm*—Sughrue Mion, PLLC (57) ABSTRACT

In a method of charging several electrochemical cells 5, 6, 7 connected in series, by a charger 1 which allows adjusting the voltage and the charging current, the voltage of each cell is detected permanently, and when a first cell reaches a predetermined threshold voltage, an increment of the charging current is applied to several cells 5, 6, 7 and simultaneously a shunt resistor of a current equivalent to the increment in the charging current of the several said cells 5, 6, 7 is connected in parallel to said first cell, and when each of the subsequent cells reaches the threshold voltage, a shunt resistor of a current equal to the increment in charging current of said several cells 5, 6, 7 is also connected in parallel to this cell. The invention is applicable to the use of accumulator systems for powering electric vehicles and thermal vehicles with self-contained electric mode.

12 Claims, 4 Drawing Sheets

METHOD AND DEVICE FOR CHARGING SEVERAL ELECTROCHEMICAL CELLS

BACKGROUND OF THE INVENTION

The present invention relates to a method of charging several electrochemical cells, particularly Lithium-Polymer cells, connected in series, a charging means for adjusting the voltage and charging current.

The invention is applicable in particular to the use of accumulator systems for powering electric vehicles (2, 3 and 4 wheels) and thermal vehicles with self-contained electric mode, where it is suitable for optimising the charging of cells so as to increase the range of action and self-sufficiency of the vehicle but also to reduce the charging time, with a view to increasing the availability of the vehicle.

According to one known method, the state of charge of each cell is detected permanently, and when one cell reaches a predetermined threshold voltage, the current supplying the cell is shunted.

A system of electrochemical accumulators (called a battery) for an electric vehicle is composed of sub-assembly elements connected permanently in series, called "cells", if their unit voltage is between 1V and 4V according to the technology of the accumulator, or "modules" if the voltage of the assembled series of cells is between 6V and 50V.

A charging device (external to the battery) is used for re-charging the battery. It is connected to an electrical distribution system, and arranged with a communication system for each module. This communication system allows charging of the battery (rules and signals) to be controlled.

The known method of charging the battery is carried out as a general rule, in two stages:

The first stage consists of charging the battery as quickly as possible, either at a constant current (Ia) or at constant power (Wa). This charging is completed when the battery reaches a predetermined upper threshold voltage.

The second stage consists of finishing charging either at a reduced constant current (I) or a reduced constant power (W). A modification of the second stage of this charging method consists in charging the battery at a constant potential (U), leaving the charging current to decrease to a minimum threshold current.

This method has the disadvantage that the state of charge of the battery can only be controlled globally. It does not allow maximisation of the stage of charge of all the cells without overcharging some of them.

In order to optimise the charging of the cells and the modules which make up the battery, a known method has been proposed of complete shunting of the charging current of each cell. Its function is to allow charging of the undercharged cells without overcharging the cells which have already been charged. The charging of the cells is in this case individualised.

The implementation of devices for carrying out a method of complete shunting of the charging current of each cell or of each module results in the first place, in an excess cost connected with the use of power and control electronic components, and in the second place, in excess weight, because of the presence of a liquid cooling system.

SUMMARY OF THE INVENTION

The invention has for its aim the creation of a method which allows optimisation of charging in an economic and reliable way, and with lighter equipment.

To this end, the invention relates to a method of charging several electrochemical cells, in particular Lithium-Polymer cells, connected in series to a charger which allows adjusting the voltage and the charging current, the method comprising permanently detecting the voltage of each cell, and when a cell reaches a predetermined threshold voltage, shunting the current of that cell, characterised by when a first cell reaches the threshold voltage, applying an increment to the charging current of said several cells and simultaneously connecting in parallel to said cell, a shunt resistor of a current equivalent to the increment of said several cells, and by when each of the subsequent cells reaches said voltage threshold, connecting also in parallel to said cell, a shunt resistor of a current equal to the increment of the charging current of said several cells.

In addition the invention may include one or more of the following characteristics:

- from the time that the increment is applied to the charging current of said several cells, if the non-shunted part of the current causes overcharging in one of the cells which has reached the threshold voltage, applying at least one decrement of the charging current until the voltage of said cell is again equal to the threshold voltage,
- the current which is shunted comprises between 1% and 30%, and preferably between 5% and 15%, of the charging current of all the cells,
- the charging current of all the cells is calculated as a function of the temperature of each of the cells,
- if the temperature T of at least one of the cells is outside a desired temperature range, the cells are heated or allowed to cool until their temperature is in the desired range,
- the range of temperatures is between 40° C. and 110° C., and preferably between 50° C. and 100° C.,
- the charging current is calculated according to the formula:

$$I\_charge = A \ \exp\left(\frac{-B}{2T}\right) \cdot S,$$

where S is the free surface of the cells being charged, A is between 80

$$\frac{mA}{cm^2}$$

and 150

$$\frac{mA}{cm^2},$$

and preferably between 105

$$\frac{mA}{cm^2}$$

and 110

$$\frac{mA}{cm^2}$$

and B is between 4200 K and 4800 K, and preferably between 4400 K and 4600 K, the surface capacitance of each cell is calculated according to the formula Cmax_charge $$\frac{(\alpha T + \beta) \cdot S}{I\_charge}$$

where α is equal to 0.01

$$\frac{mA^2}{K cm^4}$$

and β is between 3.3

$$\frac{mA^2}{cm^4}$$

and 3.2

$$\frac{mA^2}{cm^4},$$

and preferably between 3.24

$$\frac{mA^2}{cm^4}$$

3.26

$$\frac{mA^2}{cm^4},$$

S is the surface of each cell expressed in cm² and I_charge is the charging current according to the preceding formula, and the charging time is between 5 and 15 hours, preferably between 7 and 10 hours, before one cell has reached the threshold voltage, and while the voltage difference between this cell and a cell having a voltage of minimum charge is greater than a predetermined value, a part of the charging current of this cell is shunted, the voltage difference is between 10 mV and 200 mV.

The invention also relates to a device for charging several electrochemical cells, in particular Lithium-Polymer cells, connected in series to a charger which allows adjusting the voltage and the charging current, for implementing the above-mentioned method, comprising means for detecting the voltage in each cell, means for shunting the current of each cell, means for connecting the shunting means to each cell and including means for comparing the voltage of each cell with a threshold voltage, means for applying an increment to the charging current of said several cells when the voltage in one of said several cells reaches a threshold voltage, and means for shunting a part of the current equivalent to the increment.

The device may include one or more of the following characteristics:

the means for detecting the voltage of each cell comprises a voltage sensor, associated with each cell, the means for shunting the current of each cell comprises a resistor, associated with each cell, the means for connecting said shunting means comprises a switch, associated with each cell, the means for comparing the voltage comprises a voltage sensor associated with each cell and connected to a control unit, which operates said switches, the means for applying an increment of the charging current comprising said control unit, the control unit comprises in addition means for comparing the outputs of temperature sensors for each cell to a threshold temperature

BRIEF DESCRIPTION OF THE DRAWINGS

The invention will be better understood by reading the description which follows, given only as an example and with reference to the accompanying drawings, in which.

DETAILED DESCRIPTION OF THE INVENTION

Figure 1:
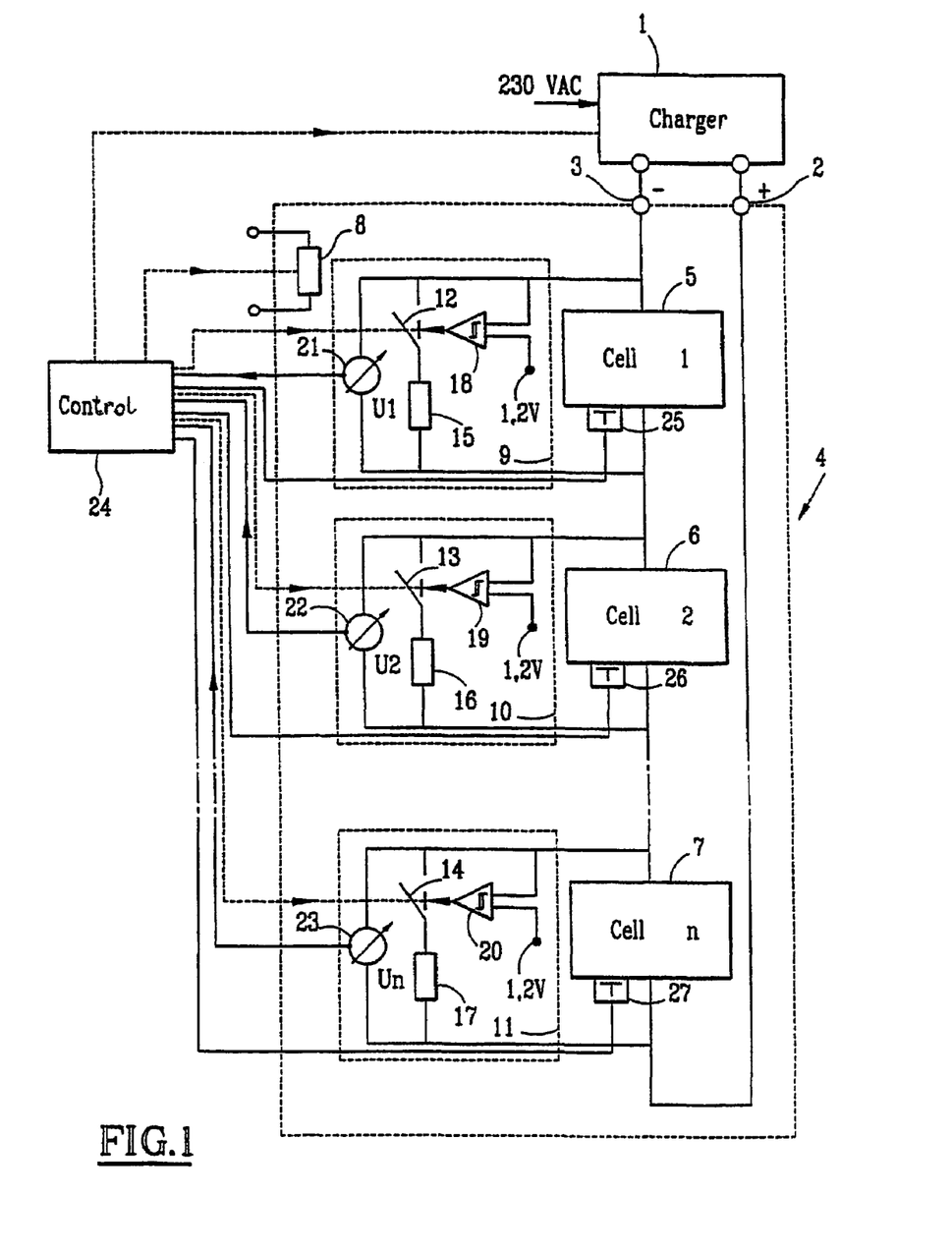
FIG. 1 is a schematic diagram of a device for implementing a method according to the invention.

FIG. 1 represents an assembly used for implementing the method of the invention.

The device comprises a charger 1 which is connected to the positive terminal 2 and negative terminal 3 of a module 4. This module forms either the whole or a part of a battery. The module contains n electrochemical cells, of the Lithium-Polymer type, of which the two first cells 5, 6 and the last cell 7 are shown. The said n cells are connected to one another in series, with one terminal of the cell 5 and the cell 7 being connected respectively to the terminals 2, 3 of the module and consequently to the charger 1.

The module 4 also includes a resistive heating element 8 connected to an energy source (not shown).

Each cell of the module is connected in parallel to a partial shunting system 9, 10, 11 comprising a shunting switch 12, 13, 14 and a resistor 15, 16, 17 connected in series with the corresponding shunting switch.

Each of the partial shunting systems 9, 10, 11 also includes a voltage comparator 18, 19, 20 which is connected to the negative side of the cell and a reference voltage source of 1.2 V, which allows operation of the associated shunting switch 12, 13, 14.

In each partial shunting system 9, 10, 11 a voltage sensor 21, 22, 23 is connected in parallel to the resistor 15, 16, 17 and to the shunting switch 12, 13, 14 and allows measurement of the voltage in the associated cell. This sensor transmits the value of the voltage to a communication interface 24.

This communication interface 24 also receives information from temperature sensors 25, 26, 27 connected to each cell.

Thus, the communication interface 24 knows the temperature and the voltage of each cell 5, 6, 7.

The communication interface 24 is connected by a control line to the heating element 8 and, and by another control line to the charger 1, which allows it to control the charging current, the charging voltage, as well as the conduction of heat into the module from the resistor element 8.

Further, the communication interface 24 controls each of the shunting switches 12, 13, 14 by respective control lines.

The device functions in the following manner:

When the charger 1 is connected to the module 4, the control interface 24 starts to measure the temperature of each cell 5, 6, 7 by means of the temperature sensors 25, 26, 27.

If the temperature of one of the cells is more than a threshold temperature (110° C. in the case of Li-Polymer cells), the control interface 24 stops the heating element 8 and waits until the temperature has dropped below the threshold temperature. In the case of a very low temperature the control interface 24 triggers heating by the resistor element 8 and waits until the temperature reaches a minimum threshold temperature (70° C. in the case of Li-Polymer cells).

When the temperature T of all the cells is acceptable, the control interface 24 instructs the charger 1 to charge the module 4 with a charging current which is calculated by the interface as a function of the temperature of the module.

$$\text{I\_charge} = A \exp\left[\frac{-B}{2T}\right] \cdot S$$

Where A is between 80 mA/cm$^2$ and 150 mA/cm$^2$, and preferably between 105 mA/cm$^2$ and 110 mA/cm$^2$ and B is between 4200 K and 4800 K, and preferably between 4400 K and 4600 K.

S is the developed surface of lithium of each cell expressed in cm$^2$.

The module is charged with a current I_charge. During charging, the charging current is recalculated and adjusted as a function of the temperature of the cells, at intervals of several seconds.

During this phase of charging, the control interface 24 triggers, by means of the control lines, for the cells whose voltage difference in comparison with a minimum voltage value of all the cells is greater than a value Maximum_voltage_difference, the shunting of a part of the current equal to I_increment, which is, in this example, about 10% of the charging current.

This value Maximum_voltage difference comprises between 25 mV and 200 mV, preferably between 30 mV and 100 mV.

If the voltage difference between one cell and the minimum voltage of the cells is less than a value Minimum_voltage_difference between 10 mV and 100 mV, preferably between 20 mV and 60 mV, the control interface 24 opens the shunting switch for this cell.

The value Minimum_voltage difference is necessarily less than or equal to Maximum_voltage_difference.

This phase of charging continues until one cell reaches its maximum threshold voltage, Umax_fin_charge, of between 3.1 V and 3.7 V and preferably between 3.2 V and 3.5 V.

At this stage in charging, the voltage comparator 18, 19 or 20 of the cell which has reached its maximum threshold voltage acts on the associated shunting switch 12, 13 or 14 and shunts a current equivalent to 1 increment by means of the associated resistor 15, 16 or 17. Simultaneously, the control interface 24 of the module instructs the charger 1 to increase the charging current by a value I_increment of between 0.5 A and 5 A, and preferably between 1 A and 2 A.

The control interface 24 therefore controls the gradual reduction of charging current to a predetermined value so that the voltage at the terminals of each cell does not exceed Umax_fin_charge. The reduction of the current is therefore permanent at intervals of several seconds.

When the other cells in succession reach their predetermined voltage, the current I_increment is similarly shunted in relation to these, and the charging current is reduced to a current equal to I_increment. The current passing through a cell whose voltage is less than Umax_fin_charge is therefore 0. If the voltage at the terminals of a cell is less than this threshold, charging continues with a value equal to I_increment.

The surface capacitance of each cell depends on the length of maximum charging and the admissible charging current and is calculated according to the formula $$\text{Cmax\_charge} = \frac{(\alpha T + \beta) \cdot S}{\text{I\_charge}}$$

in $$\frac{\text{mA}^2\text{h}}{\text{cm}^4}$$

where α is equal to 0.01

$$\frac{\text{mA}^2}{K\text{cm}^4}$$

and β is between 3.3

$$\frac{\text{mA}^2}{\text{cm}^4}$$

and 3.2

$$\frac{\text{mA}^2}{\text{cm}^4}$$

and preferably between 3.24

$$\frac{\text{mA}^2}{\text{cm}^4}$$

and 3.26

$$\frac{mA^2}{cm^4}$$

S is the surface of each cell expressed in $cm^2$ and I_charge is the charging current according to the above-mentioned formula.

Figure 2A:
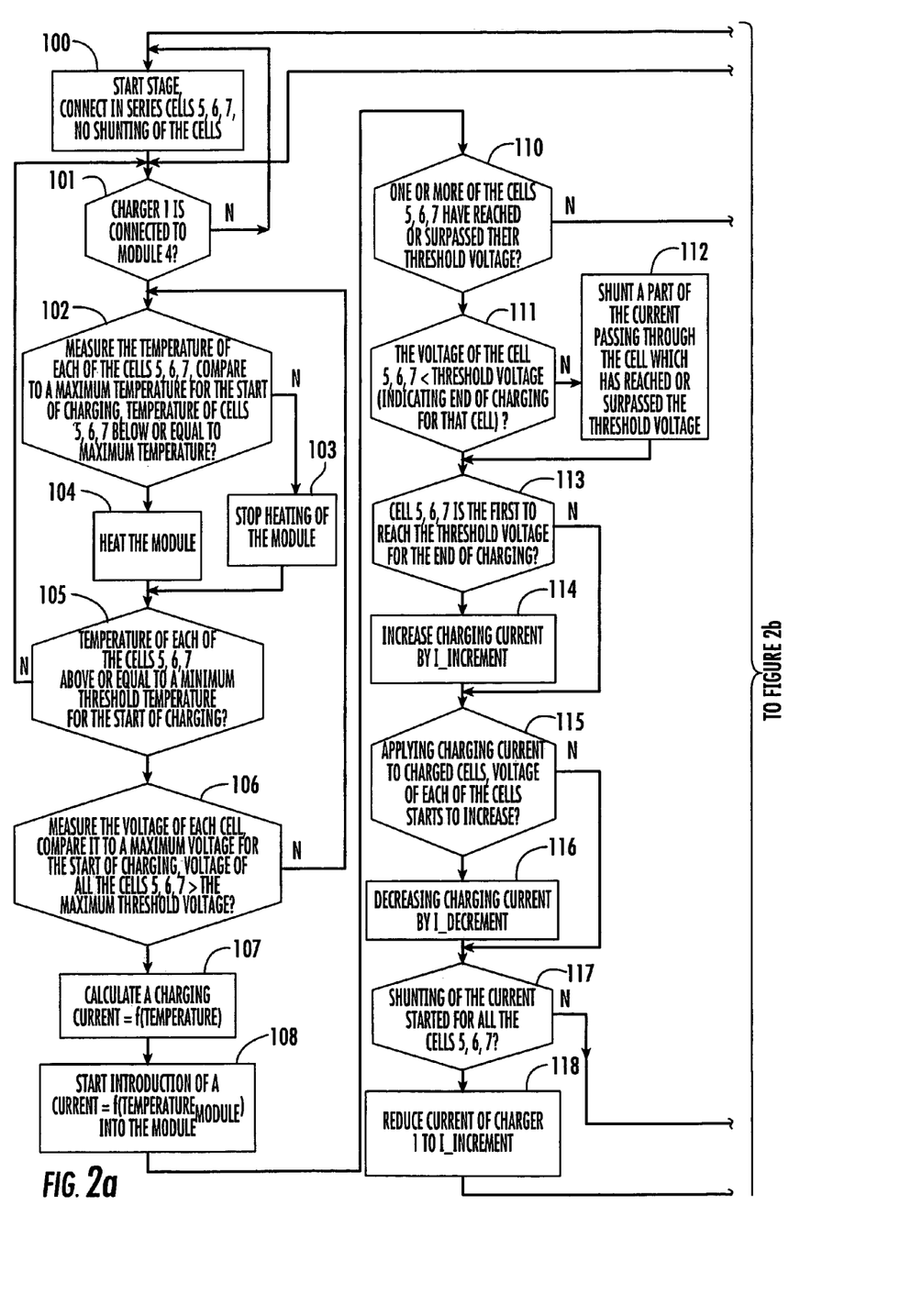
FIGS. 2a and 2b show a flow chart of the method of charging a battery according to the invention.
Figure 2B:
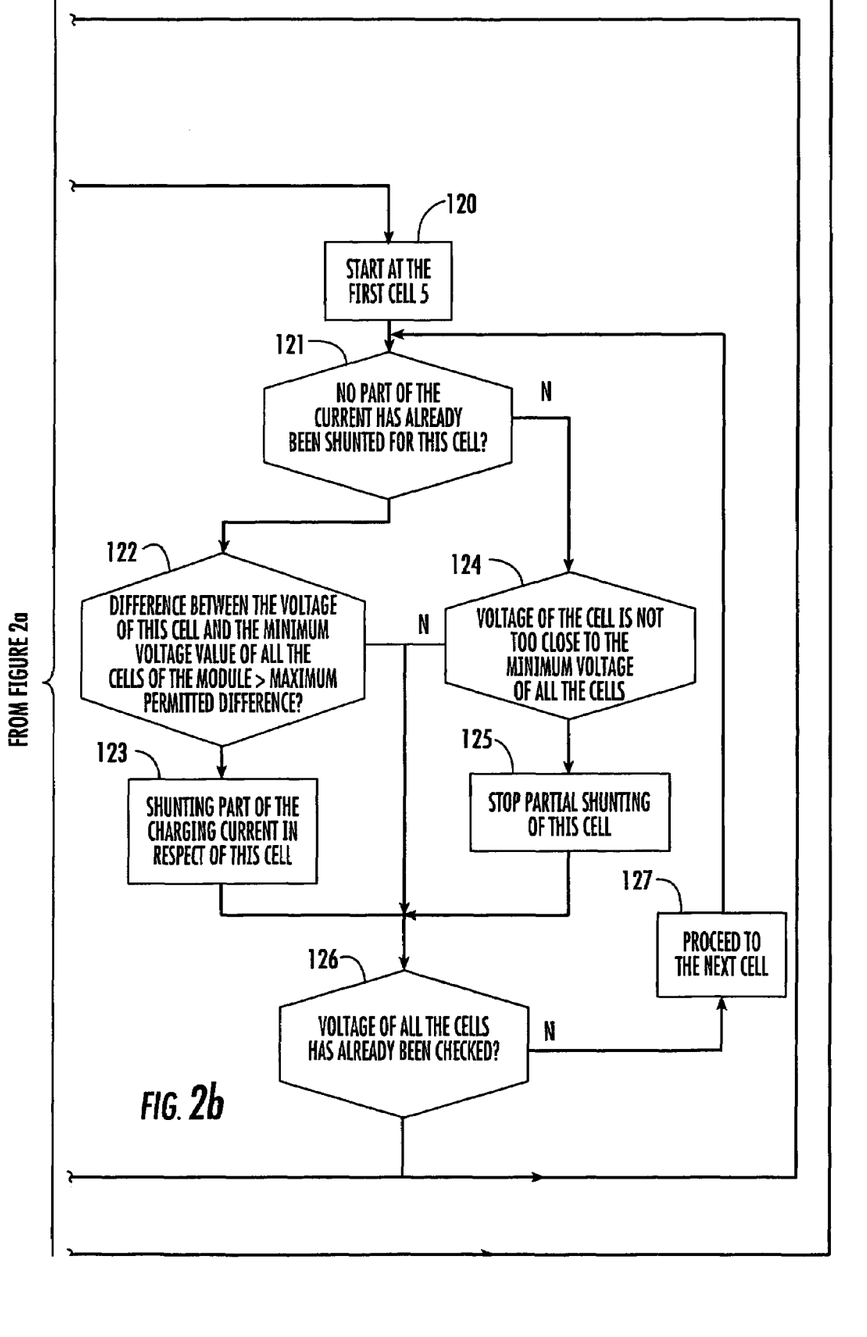

The method of the invention will now be described with reference to the flow chart of FIGS. 2a and 2b.

The method commences with a starting stage 100, in the course of which the cells 5, 6, 7 are connected in series and there is no shunting of the cells.

A second stage 101 checks whether the charger 1 is connected to the module 4. If no (N), one returns to the starting stage 100, since charging is not possible unless the charger is connected. If yes, charging is possible. Then in stage 102, the temperatures of each of the cells 5, 6, 7 is measured and each of these is compared to a maximum temperature for the start of charging. If the temperature of one or more of the cells 5, 6, 7 is above the said maximum temperature, then during the stage 103 the heating of the module is halted. If the temperature of all the cells 5, 6, 7 is lower than the said maximum temperature, the heating of the module is triggered in stage 104.

The next stage 105 consists of comparing the temperatures of each of the cells 5, 6, 7 with a minimum threshold temperature for the start of charging. If the temperature of the cells 5, 6, 7 is lower than the minimum temperature, one returns to stage 101, thus forming a loop for testing the temperature of the module 4.

In the contrary case, one goes to stage 106 for measuring the voltage and comparing it with a maximum voltage for the start of charging.

If the temperature of each of the cells 5, 6, 7 is between the two limiting temperatures, stage 106 is implemented, to measure the voltage in each cell and compare this with a maximum voltage for the start of charging. If the voltage of all the cells 5, 6, 7 is above the threshold voltage, one returns to stage 102.

If not, during stage 107 a charging current is calculated as a function of the temperature, and in stage 108, the introduction of a current into the module 4 which is a function of the temperature of the module is started.

Stage 110 looks at whether the voltage in one of the cells 5, 6, 7 has reached or gone beyond the threshold voltage which indicates the end of charging for that cell. When the voltage in the cell reaches or goes beyond the threshold voltage, a part of the current passing through that cell is shunted at 111, 112. In addition, if the said cell is the first to reach the threshold voltage for the end of charging, then in stages 113 and 114, the charging current is increased by a value I_increment. The shunted current relating to the cell is equal to the increase I_increment.

As a result, each cell which has not reached the necessary level of charge is supplied with a greater current than that supplied to the cells which have already reached the necessary level of charge.

During stage 115, the charged cells still receive charging current, and are monitored to check that the voltage of each of the cells does not start to increase. If this is the case, the charging current is decreased during stage 116 by a value I_decrement. Thus, overcharging of the already charged cells is avoided.

Stage 117 consists of checking that the shunting of the current is already started for all the cells 5, 6, 7.

If no, the method is re-commenced at stage 101.

If yes, all the cells 5, 6, 7 are in a charged state and ready for use. The current of the charger 1 is therefore reduced during stage 118 to the value I_increment, which has the consequence that the current in the cells becomes 0.

As long as some of the cells have not reached or surpassed their threshold voltage, which is checked during stage 110, the method of partially shunting the current proceeds in a different way from the above, which will be described with reference to stages 120–127.

This relates to a loop which is executed for each of the cells 5, 6, 7 of the module.

Starting at the first cell 5 (stage 120) one checks whether a part of the current has already been shunted in respect of this cell (stage 121).

If the current has not been partially shunted, stage 122 checks whether the difference between the voltage of this cell and the minimum voltage value of all the cells of the module is greater than a maximum permitted difference.

If the voltage of the cell under consideration is sufficiently close to the minimum voltage of all the cells, the whole charging current is still supplied to this cell. If not, that is to say, if the voltage of the cell is greater than the minimum voltage of the cells, a part of the charging current is shunted in respect of this cell, which is shown in stage 123.

In the case that the checking for partial shunting of the current (stage 121) finds that a part of the current has already been shunted for this cell, it checks whether the voltage of the cell is not too close to the minimum voltage of all the cells (stage 124). If yes, the partial shunting is stopped and thus the whole charging current passes through this cell (stage 125). This results in an accelerated charging of this cell.

Stage 126 checks whether the voltage of all the cells has already been checked. If no, one goes to the next cell during stage 127.

If yes, one returns to stage 101 to check the connection of the charger.

Figure 3:
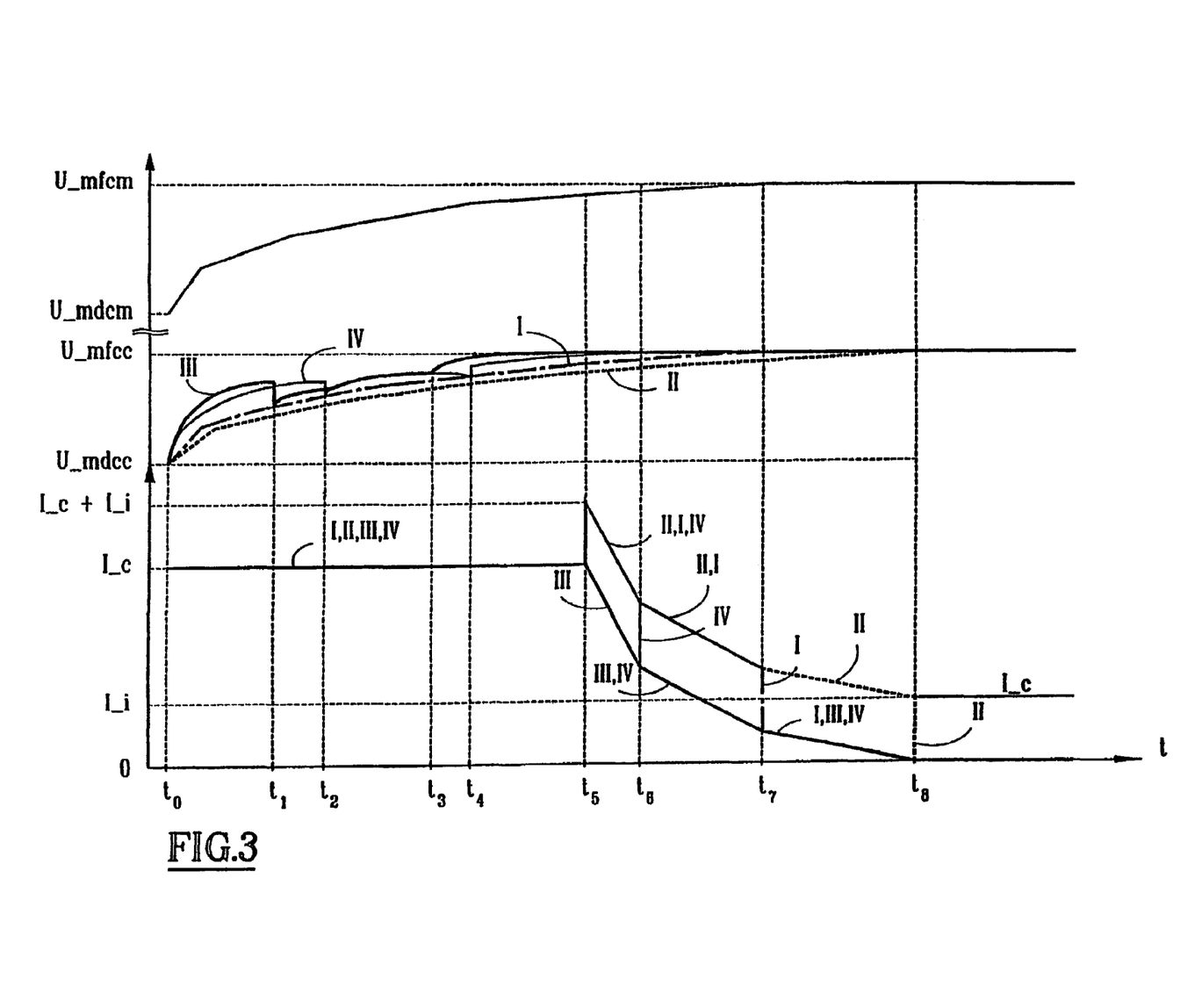
FIG. 3 is a graph representing variation in voltage and current with time in the device of FIG. 1.

FIG. 3 shows, by way of example, the operation of charging of a module with four cells in series.

Charging starts at time to with a charging current I_c (I_charge) which circulates through the four cells. The voltage of the four cells is the minimum voltage at the start of charging (U_mdcc) and the voltage of the module is the minimum voltage at the start of charging (U_mdcm). The cells charge at different rates, in any order.

Suppose, for example, that the cell III is charged the most rapidly, up to time $t_1$. At that moment the difference between the voltage of that cell and the cell which charges slowest (for example cell II) becomes greater than the difference allowed by the control interface 24 and a current I_i (I_increment) is shunted with respect to cell III.

As a result, the voltage in cell III reduces and this cell charges more slowly.

At time $t_2$, the difference between the voltage in cell IV and the voltage in cell II is such that a current I_i is shunted with respect to this cell IV.

At time $t_3$, the difference between the cell III and the cell II falls below a threshold permitted by the control interface 24, and again the whole current I_c is applied to cell III. Its charging process is therefore accelerated.

At time $t_4$, the same happens for cell IV as at time $t_3$ for cell III.

Between $t_4$ and $t_5$, all the cells are charged by I_c, when the first cell (cell III in this case) reaches the final charging voltage (U_mfcc).

The charging current is therefore increased by the value I_i but the cell III is shunted by this current due to the partial shunting system. To prevent overcharging of this cell, the current is reduced successively. One after the other, the cells IV, I and II reach the final charging voltage (U_mfcc) at times $t_6$, $t_7$, $t_8$.

At the end of charging, the current applied to each cell is 0, while the charging current is I_i.

The final voltage of the module is called U_mfcm.

Thus the amount of charging of the cells can be equalised and optimised with electronic components which are relatively simple and inexpensive.

The method and the device according to the invention have the advantages of:
- maximising and equalising the level of charge of the cells without needing an overcharging stage which can prejudice the functionality and the safety of the module;
- reducing the charging time of the module and optimising the charging current;
- maximising the level of charge of the cells as a function of the temperature of the module;
- avoiding the need for expensive power electronics for shunting the cells;
- avoiding the need for a cooling system with a thermal transfer fluid for removing the heat dissipated in the case of a total shunting system.

The invention is applicable also:
- for the supply of ship-borne electrical apparatus and starting of electric vehicles or thermal vehicles with or without self-contained electric mode;
- for emergency electrical supplies;
- for generating stations comprising at least one means of producing electricity by renewable energy (photovoltaic, wind power, biomass . . . )
- for storing electricity on the electrical network.

What is claimed is:

1. Method of charging several electrochemical cells (5, 6, 7), in particular Lithium-Polymer cells, connected in series to a charger (1) which allows adjusting the voltage and the charging current, the method comprising permanently detecting the voltage of each cell and when a cell reaches a predetermined threshold voltage, shunting the current of that cell, characterised by, when a first cell reaches the threshold voltage, applying an increment to the charging current of said several cells (5, 6, 7) and simultaneously connecting in parallel to said cell, a shunt resistor of a current equivalent to the increment of the charging current of said several cells (5, 6, 7), and by, when each of the subsequent cells reaches said threshold voltage, connecting also in parallel to each cell, a shunt resistor of a current equal to the increment in the charging current of said several cells (5, 6, 7), wherein the charging current is calculated according to the formula:

$$I\_charge = A \exp\left[\frac{-B}{2T}\right] \cdot S$$

where T is the temperature of the cells, S is the free surface of the cells being charged, A is between 80

$$\frac{mA}{cm^2}$$

and 150

$$\frac{mA}{cm^2},$$

and preferably between 105

$$\frac{mA}{cm^2}$$

and 110

$$\frac{mA}{cm^2}$$

and B is between 4200 K and 4800 K and preferably between 4400 K and 4600 K.

2. Method of charging several electrochemical cells according to claim 1, characterised in that from the time when the increment is applied to the charging current of said several cells, if the non-shunted part of the current results in overcharging in one of the cells which has reached the threshold voltage, applying at least one decrement to the charging current until the voltage of said cell is again equal to the threshold voltage.

3. Method according to claim 1, characterised in that the current which is shunted comprises between 1% and 30%, and preferably between 5% and 15% of the charging current of all the cells (5, 6, 7).

4. Method according to claim 1, characterised in that the charging current of all the cells (5, 6, 7) is calculated as a function of the temperature of each of the cells.

5. Method according to claim 4, characterised in that if the temperature of at least one of the cells is outside a desired range of temperatures, the cells are heated or allowed to cool until their temperature is in the desired range.

6. Method according to claim 5, characterised in that the range of temperatures is between 40° C. and 110° C., and preferably between 50° C. and 100° C.

7. Method according to claim 1, characterised in that the surface capacitance of each cell is calculated according to the formula $$Cmax\_charge = \frac{(\alpha T + \beta) \cdot S}{I\_charge}$$

where $\alpha$ is equal to 0.01

$$\frac{mA^2}{Kcm^4}$$

and β is between 3.3

$$\frac{mA^2}{cm^4}$$

and 3.2

$$\frac{mA^2}{cm^4},$$

and preferably between 3.24

$$\frac{mA^2}{cm^4}$$

and 3.26

$$\frac{mA^2}{cm^4},$$

and in that the charging time is between 5 and 15 hours, preferably between 7 and 10 hours.

8. Method according to claim 1, characterised in that before one cell has reached the threshold voltage and while the voltage difference between this cell and a cell which has a voltage of minimum charge is greater than a predetermined value, a part of the charging current of this cell is shunted.

9. Method according to claim 8, characterised in that said voltage difference is between 10 mV and 200 mV.

10. Device for charging several electrochemical cells (5, 6, 7), in particular Lithium-Polymer cells, connected in series to a charger (1) which allows adjusting the voltage and the charging current, for implementing the method according to claim 1, said device comprising means (21, 22, 23) for detecting the voltage in each cell, means (15, 16, 17) for shunting the current of each cell, means (12, 13, 14) for connecting the shunting means to each cell (5, 6, 7), characterised in that it further comprises means (18, 19, 20), for comparing the voltage of each cell with a threshold voltage, means (24) for applying an increment to the charging current of the said several cells (5, 6, 7) when the voltage in one of the said several cells (5, 6, 7) reaches a threshold voltage and means (15, 16, 17) for shunting a part of the current equivalent to the increment, and means for calculating the charging current according to the formula $$I_{charge} = A\ \exp\left[\frac{-B}{2T}\right] \cdot S$$

where T is the temperature of the cells, S is the free surface of the cells being charged, A is between 80

$$\frac{mA}{cm^2}$$

and 150

$$\frac{mA}{cm^2},$$

and preferably between 105

$$\frac{mA}{cm^2}$$

and 110

$$\frac{mA}{cm^2}$$

and B is between 4200 K and 4800 K, and preferably between 4400 K and 4600 K.

11. Device according to claim 10, characterised in that the means for detecting the voltage of each cell comprises a voltage sensor (21, 22, 23), associated with each cell, the means for shunting the current of each cell comprises a resistor (15, 16, 17), associated with each cell, the means for connecting the shunting means comprises a switch (12, 13, 14), associated with each cell, the means for comparing the voltage comprises a voltage sensor (21, 22, 23) associated with each cell and connected to a control unit (24), which operates said switches (12, 13, 14), the means for applying an increment of the charging current comprising said control unit (24).

12. Device according to claim 1, characterised in that the control unit (24) further comprises means for comparing the outputs of temperature sensors (25, 26, 27) of each cell (5, 6, 7) to a threshold temperature.

* * * * *